(12) United States Patent
Nykoluk et al.

(10) Patent No.: US 6,612,411 B2
(45) Date of Patent: Sep. 2, 2003

(54) METHOD OF AND DEVICE FOR EXTENDING AND RETRACTING THE WHEELS OF A PIECE OF TOWABLE BAGGAGE

(75) Inventors: Cory O. Nykoluk, St. Louis, MO (US); Mark B. Nordstrom, Brentwood, TN (US); James Edward O'Shea, Jr., Annandale, NJ (US)

(73) Assignee: TRG Accessories, Inc., LLC, St. Louis, MO (US)

( * ) Notice: Subject to any disclaimer, the term of this patent is extended or adjusted under 35 U.S.C. 154(b) by 22 days.

(21) Appl. No.: 09/800,996

(22) Filed: Mar. 7, 2001

(65) Prior Publication Data
US 2002/0125088 A1 Sep. 12, 2002

(51) Int. Cl.⁷ .............................. A45C 5/14; A45C 13/26
(52) U.S. Cl. .................... 190/18 A; 190/18 R; 190/115; 280/37; 280/355
(58) Field of Search ................................. 280/37, 47.13, 280/47.17, 655, 47.315, 47.371; 190/18 R, 18 A, 115

(56) References Cited

U.S. PATENT DOCUMENTS

| 854,602 | A | | 5/1907 | Peterson | 190/18 A |
|---|---|---|---|---|---|
| 2,510,754 | A | * | 6/1950 | Norlin | 190/18 A |
| 2,581,417 | A | * | 1/1952 | Jones | 190/18 A |
| 2,925,283 | A | * | 2/1960 | Stilger | 190/18 A |
| 3,917,038 | A | * | 11/1975 | Foge et al. | 190/18 A |
| 3,946,839 | A | * | 3/1976 | Butler | 190/18 A |
| 4,273,222 | A | * | 6/1981 | Cassimally et al. | 190/18 A |
| 4,411,343 | A | * | 10/1983 | Cassimally et al. | 190/18 A |
| 4,773,123 | A | * | 9/1988 | Yu | 190/18 A |
| 4,979,598 | A | * | 12/1990 | Verheij et al. | 190/18 A |
| 5,568,848 | A | | 10/1996 | Liang | 190/18 A |
| 5,709,398 | A | * | 1/1998 | Lu | 190/115 X |
| 5,758,752 | A | | 6/1998 | King et al. | 190/18 A |
| 5,813,503 | A | * | 9/1998 | Chang | 190/18 A |
| 6,182,981 | B1 | * | 2/2001 | Kuo | 190/18 A |
| 6,289,554 | B1 | * | 9/2001 | Wang | 190/18 A |
| 6,360,400 | B1 | * | 3/2002 | Chang | 190/18 A |
| 6,367,602 | B1 | * | 4/2002 | Chang | 190/18 A |
| 2002/0024189 | A1 | * | 2/2002 | Chen | 190/18 A |
| 2002/0121759 | A1 | | 9/2002 | Chen | 280/124.125 |

FOREIGN PATENT DOCUMENTS

GB          2245543       *   1/1992   ............... 190/18 A

* cited by examiner

Primary Examiner—Sue A. Weaver
(74) Attorney, Agent, or Firm—Lewis, Rice & Fingersh, LC

(57) ABSTRACT

A piece of towable baggage that comprises a pack portion, a retractable towing member, and a pair of towing wheels that move between stored and towing positions relative to the pack portion in response to movement of a towing member between retracted and extended positions relative to the pack portion.

13 Claims, 14 Drawing Sheets

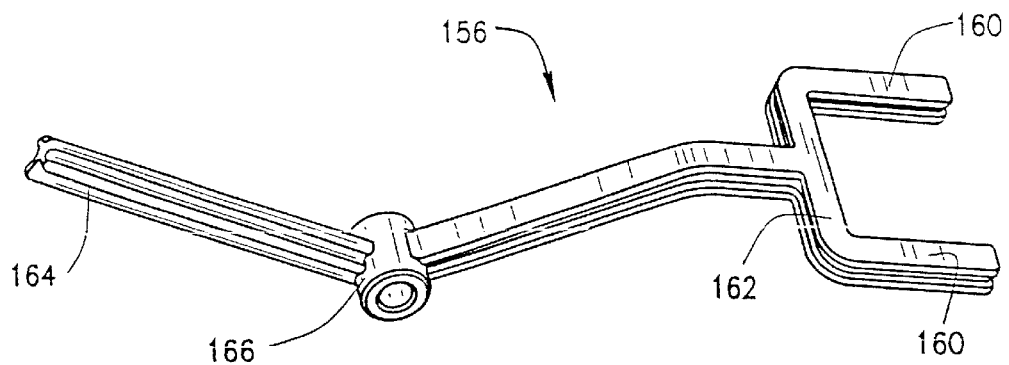
FIG. 18
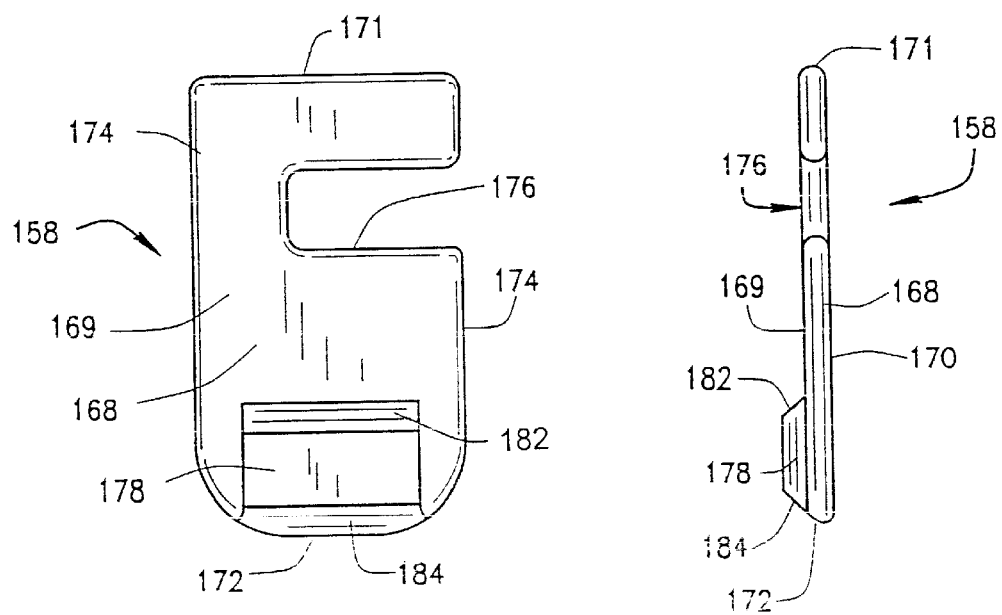
FIG. 19
FIG. 20

METHOD OF AND DEVICE FOR EXTENDING AND RETRACTING THE WHEELS OF A PIECE OF TOWABLE BAGGAGE

BACKGROUND OF THE INVENTION (1) Field of the Invention

This invention pertains to the field to the field of hand-towed baggage. More particularly, this invention pertains to the use of towing wheels on a piece of baggage that are movable between stored and towing position in response to retraction and extension of a towing member used to tow the piece of baggage. By moving the towing wheels into the stored position when the towing member is retracted, the wheels are tucked away to prevent the marring of clothing or upholstery that could otherwise used. Additionally, with the towing wheels in the towing position, the aesthetic appearance of the piece of baggage is improved.

(2) Description of the Related Art

The use of towable baggage has become widespread. As a result of the widespread use, baggage manufacturers provide towable versions of virtually all forms of baggage.

A typical piece of towable baggage comprises some type of pack portion, a pair of towing wheels, and a towing member. The pack portion of a towable piece of baggage is configured to store travel, business, or personal items and can take on various forms of baggage such as briefcases, suitcases, computer cases, duffel bags, backpacks, and virtually all other forms of baggage. In general, the pack portion of a towable piece of baggage is similar to the pack portion of the piece of baggage's non-towable counterpart.

The towing wheels are typically positioned on an edge of the pack portion's base where they allow the piece of baggage to be towed along a surface by titling the piece of onto the towing wheels from a stationary position. For baggage having a rigid pack portion, the towing wheels are often simply mounted for rotation directly to the pack portion. However, for baggage having a flexible pack portion, some form of rigid base is often utilized to support the towing wheels in their proper alignment relative to each other.

As mentioned above, a towable piece of baggage also commonly includes some form of towing member with a towing handle that is extendable from the piece of baggage. The towing member of a towable piece of baggage allows a handle to be extended from the pack portion of the piece of baggage such that a person does not need to hunch over as he or she tows the piece of baggage. The towing member also allows the piece of baggage to be pulled behind a person without coming into contact with the person's legs and feet as the piece of baggage is being towed. The retractable nature of most towing members allows the handle to be retracted toward the pack portion of the piece of baggage when the piece of baggage is not being towed.

In many cases, a wheeled piece of baggage has an extendable/retractable towing member comprised of a pair of parallel telescoping poles bridged by the towing handle. The poles slide into separate vertically oriented tubular receptacles rigidly attached to an interior compartment of the piece of the baggage. In such a configuration, the towing member is generally not visible from the exterior of the piece of baggage when stowed or retracted. Other types of baggage utilize single-pole telescoping tow members that extend and retract from a single tubular receptacle that is centrally positioned between the wheels of the piece of baggage. Yet other types of baggage utilize non-telescoping extendable towing members such as bars or poles that are hinged to the piece of baggage.

Despite the advantages associated with a piece of towable baggage, such baggage also have several disadvantages.

A significant disadvantage associated with towable baggage is that the towing wheels often become dirty and grimy from towing the piece of baggage along unclean surfaces. This becomes a problem when persons choose to carry their baggage rather than to tow such baggage. In such situations, the towing wheels often come in contact with the person's clothing and transfer the dirt and grime on the wheels to the clothing. This is also a problem when a person places his or her piece of towable baggage in the trunk of an automobile or a car seat, or on furniture such a sofa or bed where the dirt and grime can soil or damage upholstery or bed linen.

Another disadvantage associated with towable baggage is that many persons believe that towing wheels diminish the aesthetic appearance of a piece of baggage. The unsightliness of the towing wheels cause some people to forego the advantages of towable baggage in favor of conventional non-towable baggage having a cleaner, more aesthetically pleasing, appearance. This is especially true for people who prefer more expensive luggage designs.

SUMMARY OF THE INVENTION

The present invention overcomes the disadvantages associated with the use of prior art towable baggage by providing a piece of towable baggage that has towing wheels that move between stored and towing positions in response to movement of the towing member between the retracted and extended positions.

In one aspect of the present invention, a towable piece of baggage comprises a pack portion, a towing member that is movable between retracted and extended positions relative to the pack portion, and two wheel assemblies operatively connected to the pack portion. Each of the two wheel assemblies comprises a wheel operatively connected to a wheel housing in a manner such that the wheel is movable between stored and towing positions relative to the wheel housing in response to the towing member being moved between the retracted and extended positions. When the towing member is moved from the retracted position to the extended position, the wheels move into the towing position where the wheels at least partially protrude from the wheel housings. When the towing member is moved from the extended position to the retracted position, the wheels move into the stored position where they are positioned within the housings.

In another aspect of the present invention, a towable piece of baggage comprises a pack portion, a towing member that is movable between retracted and extended positions relative to the pack portion, two wheels operatively connected to the pack portion, a linkage, and a locking mechanism. Each of the two wheels is operatively connected to the pack portion in a manner such that the wheel is movable between stored and towing positions relative to the pack portion. The linkage operatively connects the towing member to the two wheels in a manner to cause each of the two wheels to move between the towing and stored positions in response to movement of the towing member between the extended and retracted positions. The locking mechanism is operatively connected to the towing member and the wheels and moves between locked and unlocked positions in response to movement of the towing member between the retracted and extended positions. The locking mechanism prevents each of the wheels from moving from the towing position to the stored position when the locking mechanism is in the locked position and allows each of the wheels to move between the stored and towing positions when the locking mechanism is in the unlocked position. As such, the locking mechanism is able to transmit load from each of the wheels to the pack portion when the wheels are in the towing position such that the linkage is relieved of load.

In yet another aspect of the invention, a method of repositioning wheels on a piece of towable baggage comprises providing a piece of baggage having a pack portion, a pair of wheels that are movable between stored and towing positions relative to the pack portion, and a retractable towing member that is movable between extended and retracted positions relative to the pack portion. The method further comprises moving the wheels from the stored position to the towing position by moving the towing member from the retracted position to the extended position, locking the wheels in the towing position by positioning the towing member in the extended position, unlocking the wheels while the wheels are in the towing position by moving the towing member from the extended position, and then moving the wheels from the towing position to the stored position by further moving the towing member from the extended position.

While the principle advantages and features of the invention have been described above, a more complete and thorough understanding of the invention may be attained by referring to the drawings and the detailed description of the preferred embodiment, which follow.

BRIEF DESCRIPTION OF THE DRAWINGS

FIG. 18 is an isometric view of one of the arms of the linkage assembly of the preferred embodiment of the invention.

FIG. 19 is a plan view of one of the lock release members of the linkage assembly of the preferred embodiment of the invention.

FIG. 20 is a side view of the lock release member of FIG. 19.

Reference characters in the written specification indicate corresponding parts throughout the several views of the drawings.

DETAILED DESCRIPTION OF THE PREFERRED EMBODIMENT

Figure 2:
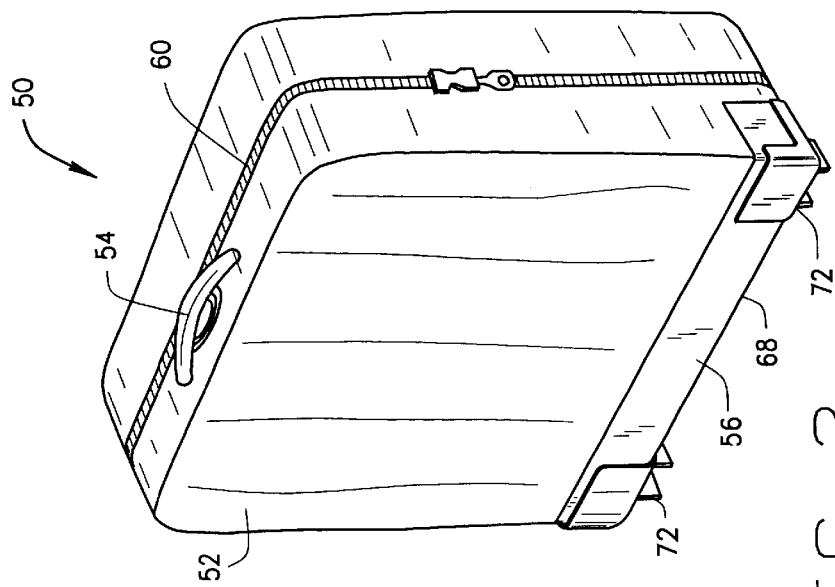
FIG. 2 is an isometric view of the preferred embodiment of the piece of baggage shown with the towing member in the retracted position and with the towing wheels in the stored position.
Figure 1:
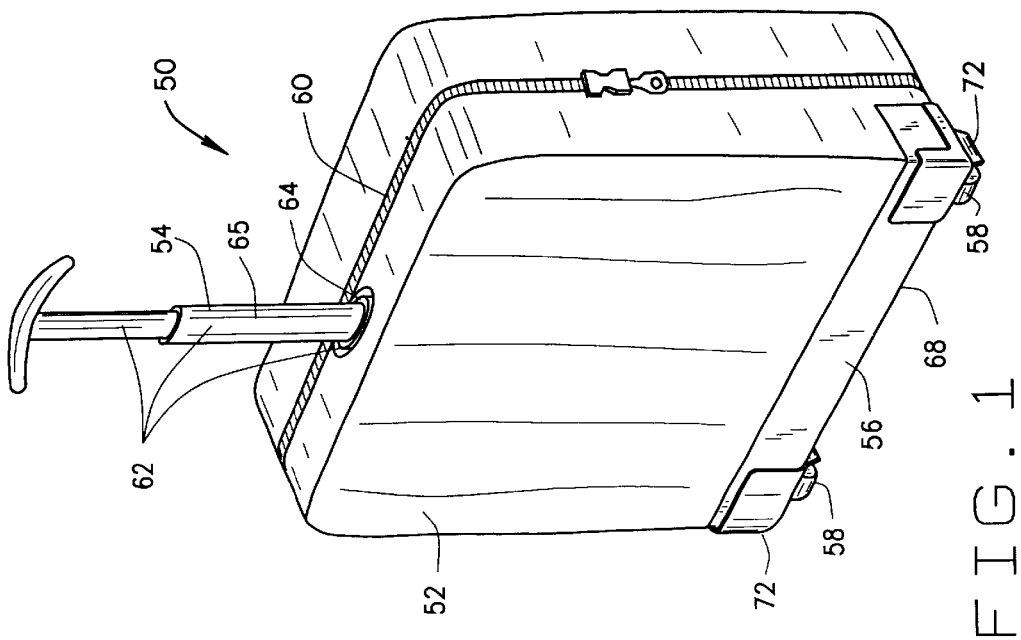
FIG. 1 is an isometric view of the preferred embodiment of a piece of baggage of the invention shown with the towing member in the extended position and with the towing wheels in the towing position.
Figure 3:
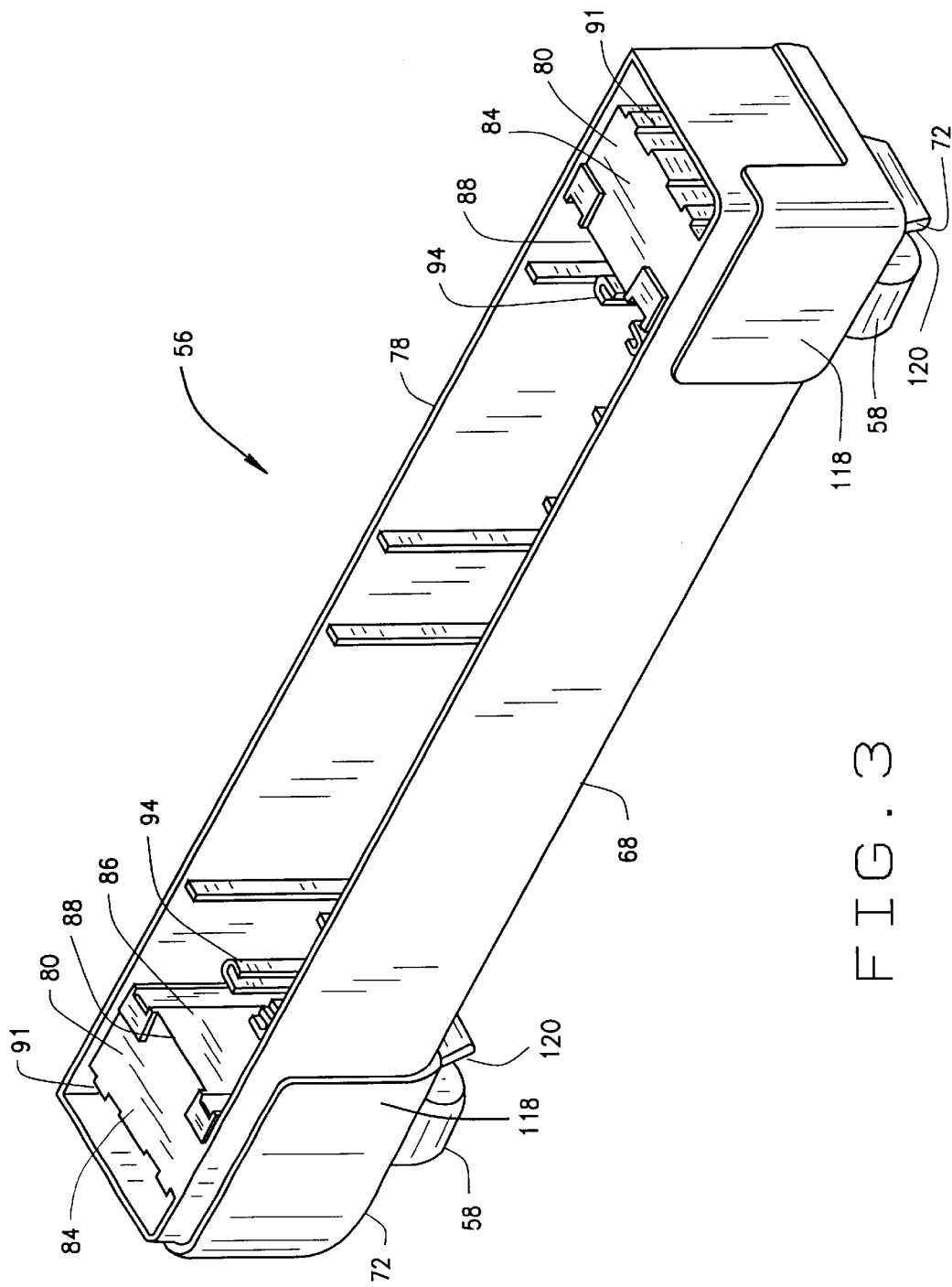
FIG. 3 is an isometric view of the base assembly of the preferred embodiment of the invention with the towing wheels in the towing position.
Figure 4:
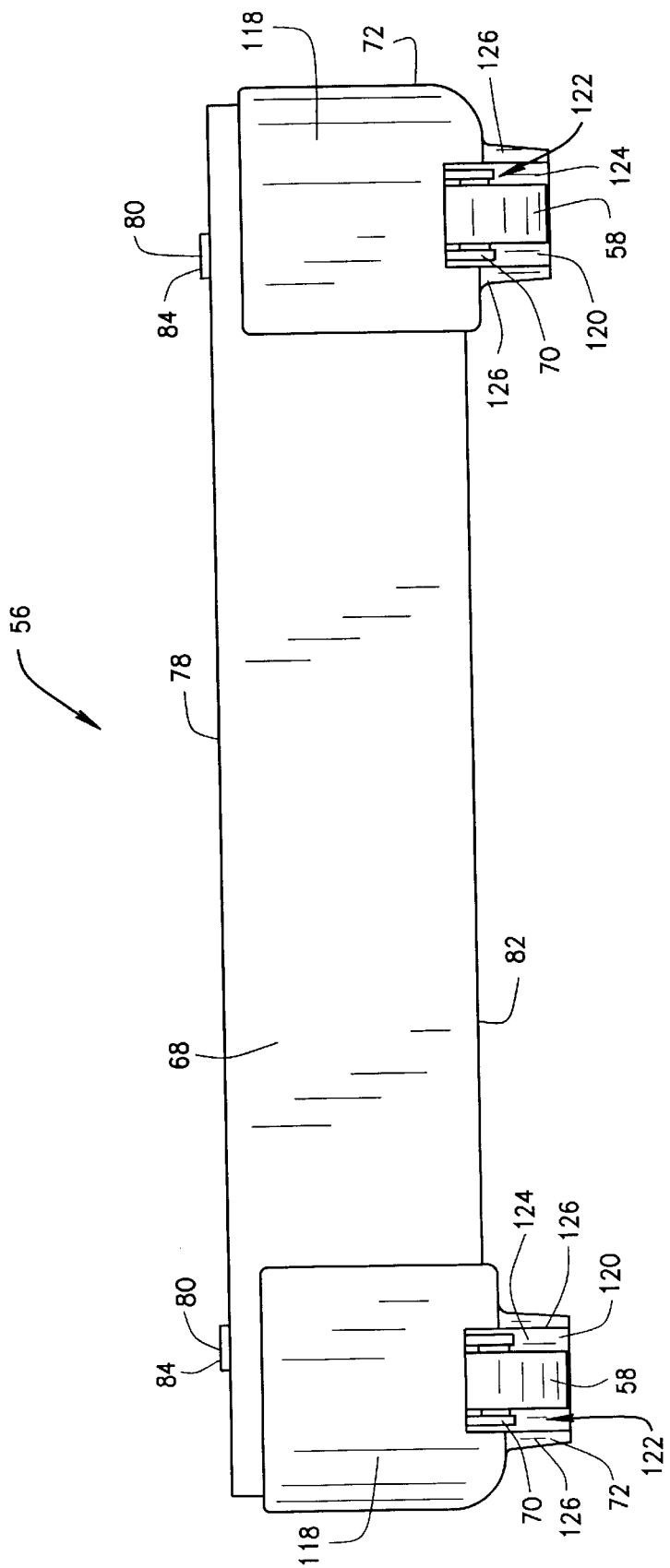
FIG. 4 is a front view of the base assembly of the preferred embodiment shown with the towing wheels in the towing position.

The preferred embodiment of the piece of baggage 50 of the invention is shown in FIGS. 1 and 2. In general, the piece of baggage 50 of the preferred embodiment comprises a pack portion 52, a retractable towing member 54, and a base assembly 56 on which towing wheels 58 are mounted. When the towing member 54 is extended from the pack portion 52 of the piece of baggage 50 as shown in FIG. 1, the towing wheels 58 are positioned in a towing position relative to the base assembly 56 to allow the piece of baggage 50 to be towed along a surface using the towing member 54. Alternatively, when the towing member 54 is retracted into the pack portion 52 of the piece of baggage 50 as shown in FIG. 2, the towing wheels 58 are positioned in a stored position to improve the aesthetic appearance of the piece of baggage and to prevent the towing wheels from marring upholstery or clothing when the piece of baggage is carried, stored, or otherwise used.

The pack portion 52 of the piece of baggage 50 of the preferred embodiment of the invention is a standard travel case of the type having one or more storage compartments 60 for the placement of travel items. In general, the pack portion is preferably constructed of woven fabric material that holds its shape by being sewn around a ridged support structure. However, it should be understood that the particular type of the pack portion 52 is not a key feature of the invention and it should be appreciated that the pack portion could be any type of baggage, such as a computer case, backpack, or duffel bag.

The towing member 54 of the piece of baggage 50 of the preferred embodiment of the invention is a mono-pole member of the type comprised of a plurality of tubular telescoping sections 62 that retract into one another. The tubular sections 62 of the towing member 54 preferably have an oval shape and are preferably formed of metal. One of the telescoping sections 62 is directly attached to the pack portion 52 of the piece of baggage 50 and forms a base section 64 of the towing member 54 into which all other telescoping sections retract. The piece of baggage 50 of the preferred embodiment utilizes the relative movement between the base section 64 of the towing member 54 and the next telescopically attached, second section 65 of the telescoping sections 62 to reposition the towing wheels 58 between the stored and towing positions as described below. The base section 64 of the towing member 54 is modified for this purpose with a pair of slots 66 extending upwardly from the bottom end 67 on opposite sides of the base section. However, it should be appreciated that numerous types of retractable towing members exist and that the motion of any type of retractable towing member, new or old, telescoping or non-telescoping, mono-pole or dual-pole, could be used for this purpose.

The base assembly 56 of the piece of baggage 50 of the preferred embodiment of the invention provides structure for attachment of the towing wheels 58 to the pack portion 52 and for holding the towing wheels in alignment when the piece of baggage is towed. Additionally, the base assembly 56 comprises various components that operate to move the towing wheels 58 between the towing and stored positions in response to movement of the towing member 54 between the extended and retracted positions. In general, the base assembly 56 comprises a main assembly housing 68, a pair of wheel mounts 70, the towing wheels 58, a pair of feet 72, a locking assembly 74, and a linkage assembly 76.

Figure 11:
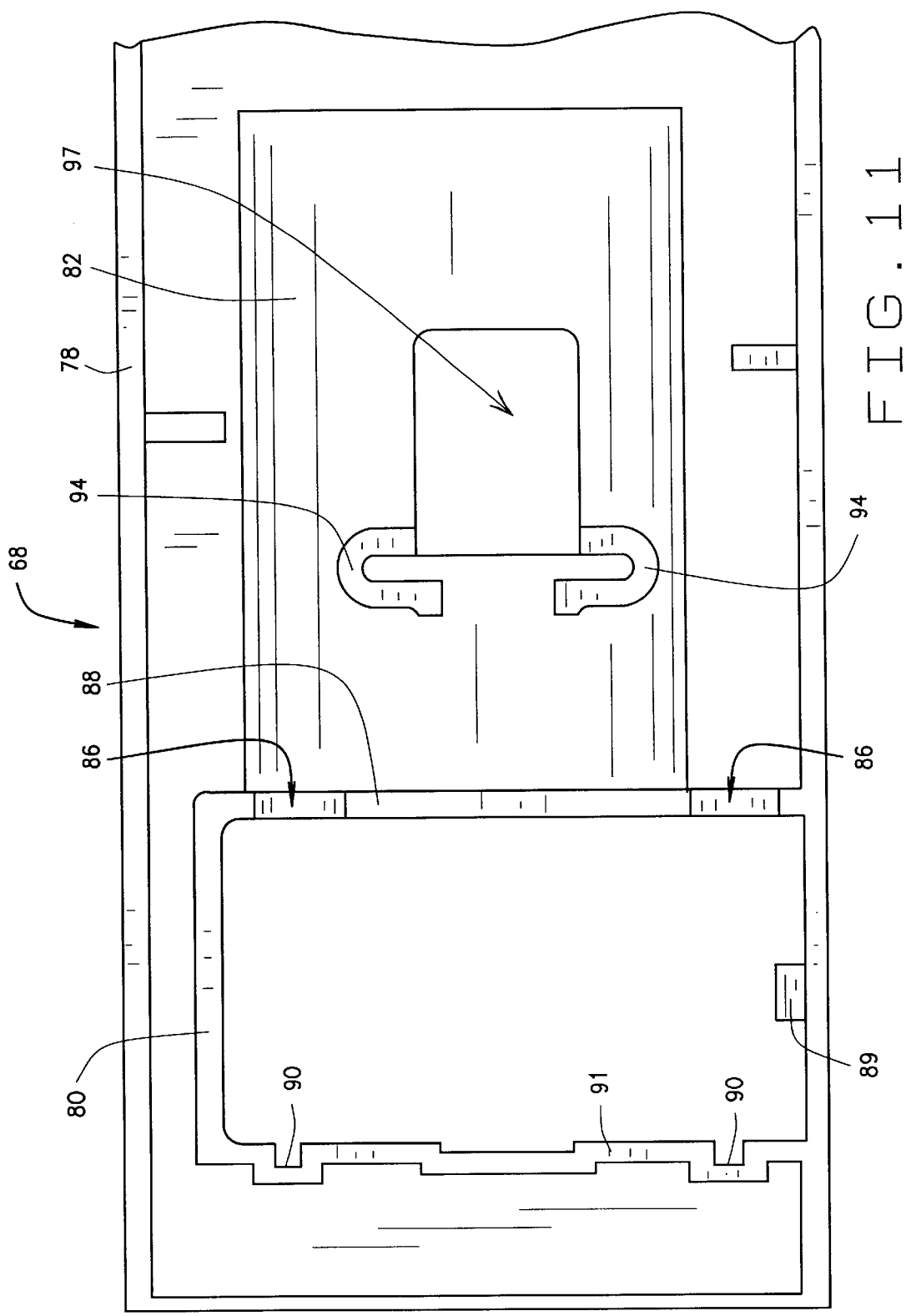
FIG. 11 is a partial top view of the main assembly housing of the preferred embodiment of the invention shown in cross-section.

The main assembly housing 68 is a rectangular shell that is open at its top 76 and is preferably formed of polymeric material as a single piece. Two wheel mount receptacles 80 are position at opposite ends of the main assembly housing 68 and extend upwardly from the bottom wall 82 of the main assembly housing. The wheel mount receptacles 80 are themselves thin walled shells that are generally rectangular in shape. The walls of the wheel mount receptacles 80 surround hollow interiors of the receptacles that are closed at their tops by a top wall 84 of each wheel mount receptacle and that are open to the exterior of the piece of baggage through the bottom wall 82 of the main assembly housing 68. A pair of vertical slots 86 extend through mutually opposed inboard walls 88 of the wheel mount receptacles 80. As seen in the cross-sectioned view of the receptacles 80 from above in FIG. 11, each of the wheel mount receptacles 80 also has a resilient tab 89 at its base that resiliently protrudes into its hollow interior and each has a pair of vertically oriented guide channels 90 formed in an interior surface of an outboard wall 91.

In addition to the wheel mount receptacles 80, the main assembly housing 68 also has a centrally positioned towing member mount 92 that protrudes upwardly from the bottom wall 82 of the main assembly housing. Furthermore, a pair of lock release member guides 94 and a pair of arm mounts 96 also protrude upwardly from the bottom wall 82 of the main assembly housing 68. Finally, a rectangular opening 97 extends through the bottom wall 82 of the main assembly housing 68 adjacent each of the lock release member guides 94.

Figure 12:
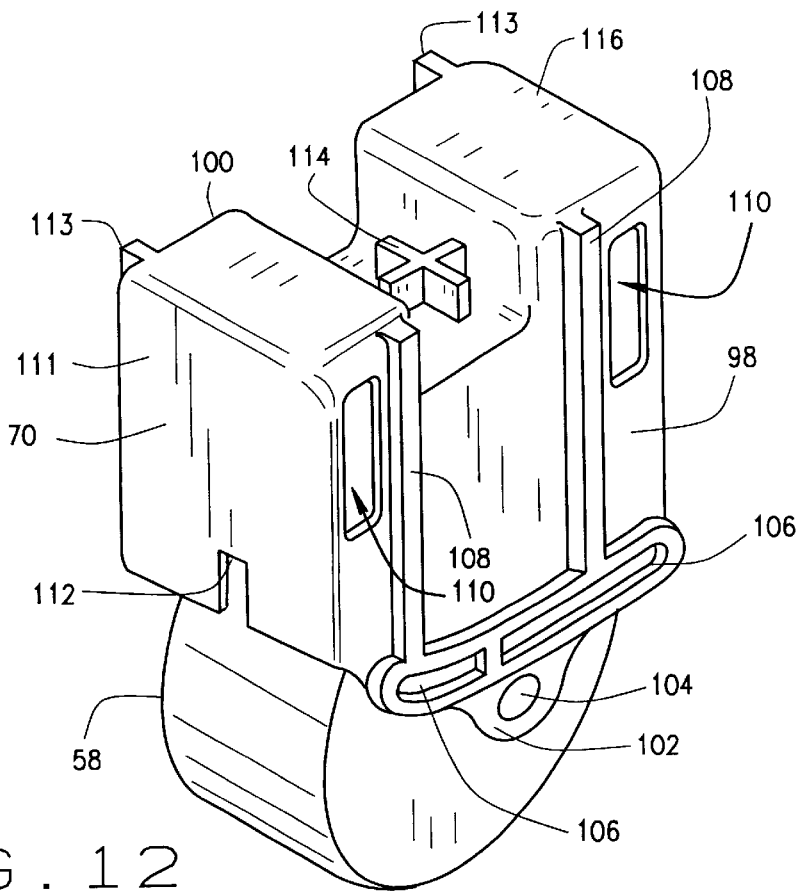
FIG. 12 is an isometric view of one of the towing wheels mounted on a wheel mount of the preferred embodiment of the invention.
Figure 13:
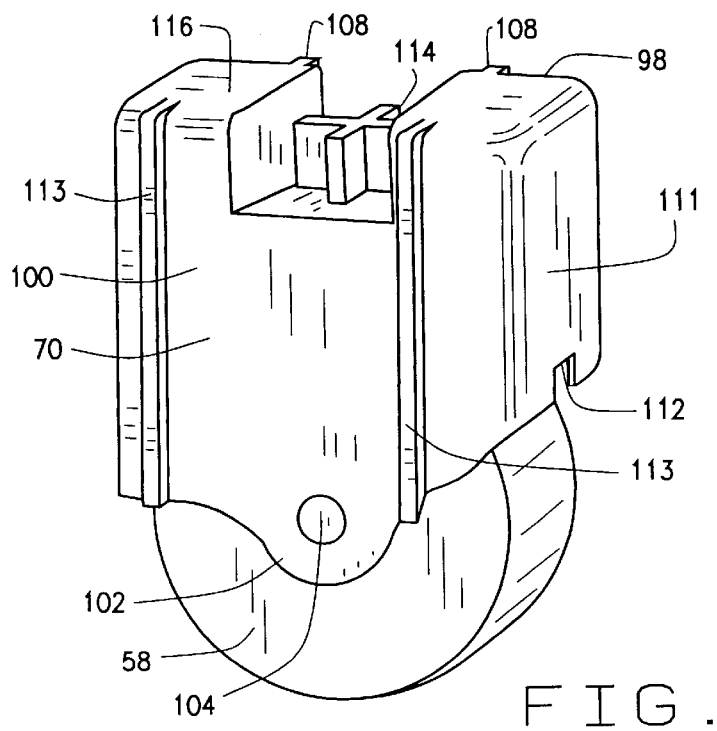
FIG. 13 is an isometric view of the towing wheel and the wheel mount of FIG. 12 shown from the opposite side.

The wheel mounts 70 of the base assembly 56 of the piece of baggage 50 connect the towing wheels 58 to the main assembly housing 68. Each of the wheel mounts 70 is a mirror image of the other and, thus, for purposes of this description, only one of the wheel mounts is described in detail. The wheel mount 70 is shown in FIGS. 12 and 13 with one of the towing wheels 58 attached thereto. The wheel mount 70 is preferably formed of polymeric material and is generally shaped similar to an inverted rectangular box to form a wheel-well over the attached towing wheel 58. The wheel mount has an inboard wall 98 that faces the center of the main assembly housing 68 when attached thereto and an outboard wall 100 that faces the opposite direction. The inboard 98 and outboard 100 walls of the wheel mount 70 each have a journal 102 formed therein for supporting a fixed axle 104 on which the towing wheel 58 is rotationally mounted. A pair of locking indentations 106 extend into the inboard wall 98 of the wheel mount 70 and are positioned slightly above the journal 102. A pair of vertically oriented spacer rails 108 extend upwardly from the locking indentations 106 along the inboard wall 98 of the wheel mount 70. A pair of arm slots 110 are positioned at opposite corners adjacent the top of the inboard wall 98 of the wheel mount 70 and extend through the inboard wall. Additionally, the wheel mount has a front wall 111 that has a notch 113 centrally positioned at its base. Finally, a pair of guide rails 113 extend vertically across and protrude outwardly from the outboard wall 100 of the wheel mount 70 and an X-shaped spring mount 114 is centrally positioned and protrudes upwardly from a top wall 116 of the wheel mount.

Each of the towing wheels 58 is preferably a conventional wheel of the type having an internal bearing (not shown) such that it is free to rotate about the fixed axle 104 when attached to the wheel mount 70. Additionally, the towing wheels 58 are preferably formed of hard rubber to reduce noise and provide a smooth feeling when the piece of baggage 50 is being towed.

Figure 14:
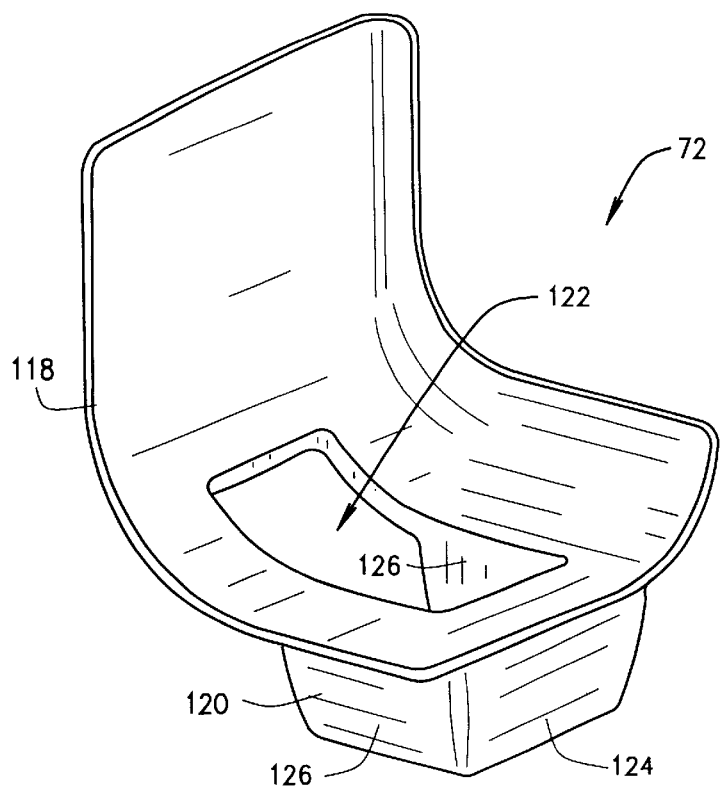
FIG. 14 is an isometric view of one of the feet of the preferred embodiment of the invention.

The feet 72 of the base assembly 56 of the piece of baggage 50 serve a dual function of supporting the baggage in an upright position when the piece of baggage is not being towed and partially housing the towing wheels 58. Like the wheel mounts 70, each of the feet 72 is a mirror image of the other and for purposes of this description only one is described herein. The foot 72 is preferably formed of a polymeric material and, as shown in FIG. 14, has upper portion 118 and a lower skirt 120 extending downwardly therefrom. The upper portion of the foot 72 has an opening 122 and is shaped to conform to the exterior shape of the main assembly housing 68. Thus, the foot is configured to be attached to a lower corner of the main assembly housing with the opening 122 of the foot positioned beneath one of the openings through the bottom wall 82 of the main assembly that provides access to the hollow interior of the adjacent wheel mount receptacle 80. The lower skirt 120 has a back wall 124 and a pair of side walls 126 that extend partially around the opening 122, leaving the front of the skirt open.

Figure 15:
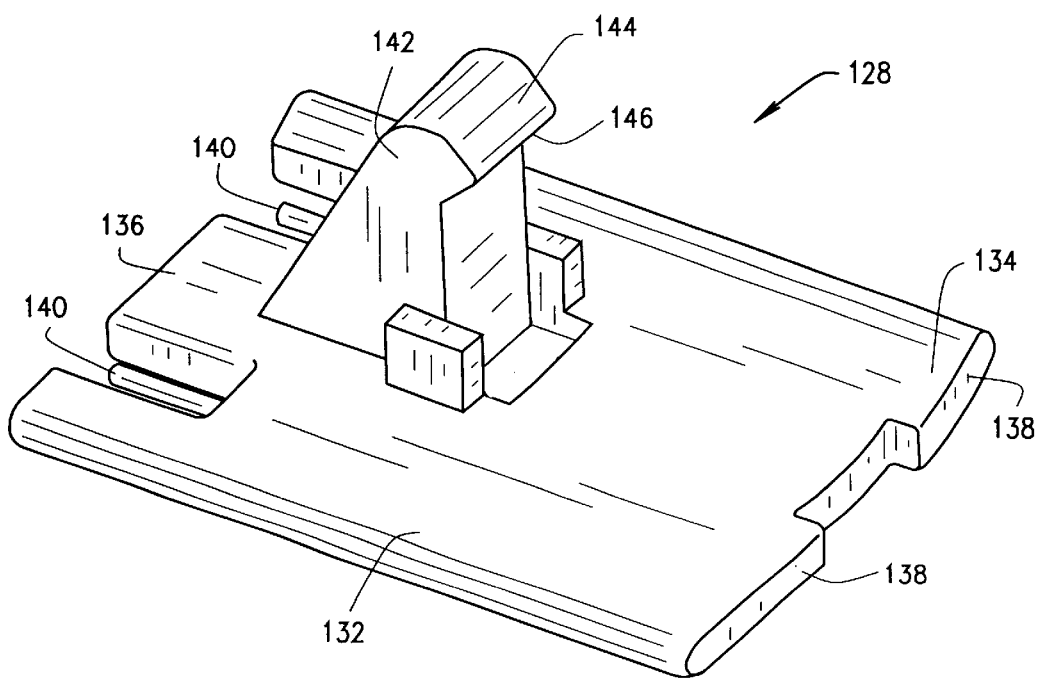
FIG. 15 is an isometric view of one of the locking members of the preferred embodiment of the invention.

The locking assembly 74 of the main assembly housing 68 of the piece of baggage 50 comprises a pair of locking members 128 and a pair of locking member guides 130, all of which are preferably formed of polymeric material. Like many of the other components, each of the locking members 128 is a mirror image of the other and therefore only one will be described. As shown in FIG. 15, the locking member 128 has a rectangular shaped main body 132 and slightly curved opposite outboard 134 and inboard 136 ends. A pair of locking protrusions 138 extend from the outboard end 134 of the main body 132 and are shaped to engage in the locking indentations 106 in the inboard side 98 of one of the wheel mounts 70. The curvature of the locking member cross-section and the curvature of the locking protrusions 138 match the curvature of the wheel mount locking indentations 106 that can be seen in FIG. 12. A pair of spring posts 140 are positioned at the inboard end 136 of the main body 132 and a release tab 142 having upper 144 and lower 146 sloped surfaces extends upwardly from near the center of the main body.

Figure 16:
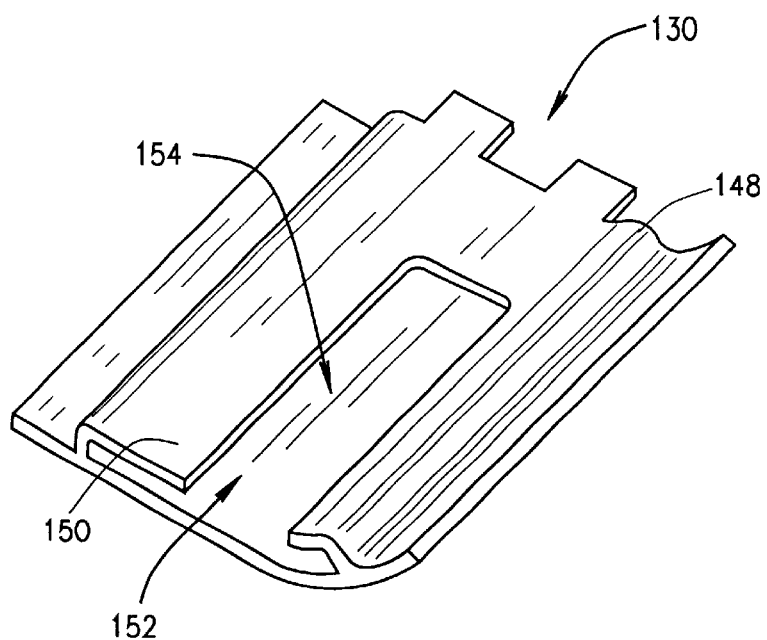
FIG. 16 is an isometric view of one of the locking member guides of the preferred embodiment of the invention.

Like the locking members 128, each of the locking member guides 130 is a mirror image of the other and therefore only one will be described. FIG. 16 shows a locking member guide corresponding to the locking member shown in FIG. 15. As shown, the locking member guide 130 has opposite inboard 148 and outboard 150 ends and a generally horizontally oriented pocket 152 that is open on the outboard end thereof. As seen in FIG. 16, the interior of the pocket has a cross section curvature that matches that of the main body 132 of the locking member 128. A slot 154 passes through the pocket 152 to the pocket interior and extends from the outboard end 150 of the locking member guide 130 toward the inboard end 152 and is dimensioned to allow the release tab 142 of the locking member 128 to pass therethrough.

Figure 17:
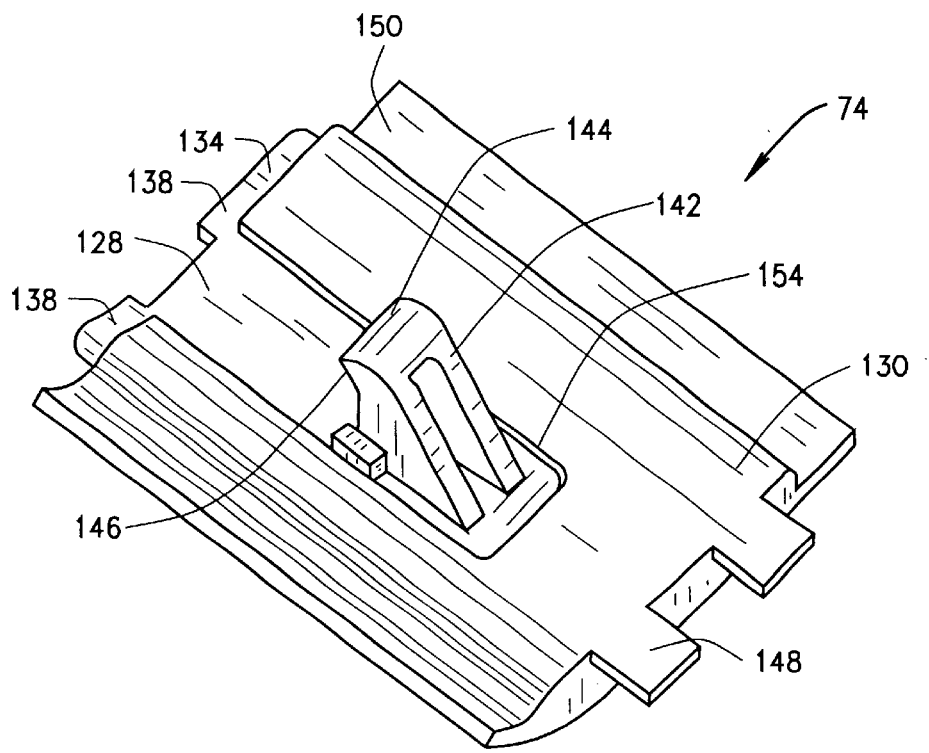
FIG. 17 is an isometric assembly view of the locking member and locking member guide of FIGS. 15 and 16.

Each of the locking members 128 is assembled with the corresponding locking member guide 130, as shown in FIG. 17, to form the locking assembly 74. This is done by first positioning a pair of small compression springs (not shown) on the pair of spring posts 140 and then inserting the inboard end 136 of each locking member 128 into the pocket 152 of the corresponding locking member guide 130 with the release tab 142 of the locking member extending upwardly through the slot 154 of the locking member guide. Each locking member 128 and corresponding locking member guide 130 are dimensioned such that the main body 132 of the locking member can be completely inserted into the pocket 152 of the locking member guide. The pair of compression springs (not shown) placed on the spring posts 140 of the locking member 128 bias the locking member outwardly from the pocket 152 as shown in FIG. 17. Thus, the locking protrusions 138 of the locking member 128 will extend past the outboard end 150 of the locking member guide 130 except when an inboard force is exerted on the release tab 142 of the locking member that is sufficient to overcome the biasing force of the springs.

The linkage assembly 76 comprises a pair of arms 156 and a pair of lock release members 158 that are preferably formed of polymeric material. Each of the pair of arms 156 is identical to the other and has a pair of tines 160 that form a forked end 162 of the arm as shown in FIG. 18. The length of the arm 156 is formed as a bell crank that extends from the forked end 162 to a free end 164 and has a V-shape with a pivot journal 166 at the crank fulcrum or apex of the V-shape. The lock release members 158 are also identical to each other and are shaped as shown in FIGS. 19 and 20. Each of the lock release members 158 comprises a generally flat body 168 having opposite inboard 169 and outboard 170 surfaces bounded by an upper edge 171, a lower edge 172, and opposite side 174 edges. A slit 176 is formed in the body 168 extending horizontally from one of the side edges 174 toward the opposite side edge in a position adjacent the upper edge 171 of the body. Finally, a wedge protrusion 178 extends outwardly from the inboard surface 169 of the body 168 adjacent the lower edge 172. The wedge protrusion 178 has upper 182 and lower 184 sloped surfaces.

The various components of the base assembly 56 of the piece of baggage 50 are assembled together by first assembling the towing wheels 58 onto the fixed axles 104 of the wheel mounts 70 as described above and shown in FIGS. 12 and 13. The wheel mounts 70 are then inserted into the wheel mount receptacles 80 of the main assembly housing 68 from beneath the main assembly housing. As this is done, the resilient tab 89 at the base of each of the wheel mount receptacles 80 resiliently deflects out of the hollow interior of the wheel mount receptacle as they engage the wheel mounts 70. Additionally, a vertically oriented compression spring 186 is positioned on the spring mount 114 of each of the wheel mounts 70 where the springs will engage with the top walls 84 in the interior of the wheel mount receptacles 80 and act to force the wheel mounts downward relative to the main assembly housing 68. The wheel mounts 70 and the wheel mount receptacles 80 of the main assembly housing 68 are dimensioned such that the spacer rails 108 of the wheel mounts slidably engage the inboard walls 88 of the wheel mount receptacles and such that the guide rails 113 of the wheel mounts slidably engage in the guide channels 90 of the outboard walls 91 of the wheel mount receptacles.

Once the wheel mounts 70 are partially inserted into the wheel mount receptacles 80 of the main assembly housing 68, it becomes necessary to overcome the force created by the compression springs 186 as they act to push the wheel mounts downward relative to the main assembly housing. However, as the wheel mounts 70 are moved further into the wheel mount receptacles 80 of the main assembly housing 68, the resilient tabs 89 of the wheel mount receptacles 80 eventually pass over the notches 112 in the front walls 111 of the wheel mounts 70 and move back into the interior of the wheel mount receptacles where they prevent the wheel mounts from moving back out of the wheel mount receptacles.

With the wheel mounts 70 assembled to the main assembly housing 68 of the base assembly 56, the locking assembly 74 is then assembled as described above. The locking member guides 130 of the locking assembly 74 are then rigidly connected to the main assembly housing 68 from beneath the main assembly housing, with the release tabs 142 of the locking members 128 projecting upwardly through the rectangular openings 97 of the main assembly housing. This is preferably done using fasteners, but glue or other suitable means for attachment can also be used for this purpose. To improve the aesthetic appearance of the piece of baggage 50, the bottom wall 82 of the main assembly housing 68 and the locking member guides 130 are configured such that the locking member guides are flush with the contour of the remainder of the main assembly housing when attached thereto.

While the locking member guides 130 are being positioned on the main assembly housing 68, it is necessary to hold each of the locking members 128 in the pocket 152 of the corresponding locking member guide 130 to counteract the force of the compression springs biasing them apart. However, once each of the locking member guides 130 is in place, the corresponding locking member 128 can be released where it will then be biased against the wheel mount 70, causing the locking protrusions 138 of the locking member to engage into the locking indentations 106 of the wheel mount. This locks the wheel mounts 70 in position relative to the wheel mount receptacle 80 of the main assembly housing 68 by preventing the wheel mounts from moving further upward into the wheel mount receptacles. It should be appreciated the resilient tabs 89 of the wheel mount receptacles 80 and the notches 112 in the front walls 111 of the wheel mounts 70 are configured such that the locking protrusions 138 of the locking members 138 are aligned with the locking indentations 106 of the wheel mounts 70 when the wheels mounts are in their lowest position relative to the wheel mount receptacles 80.

The feet 72 then mounted beneath the main assembly housing 68 of the base assembly 56 and are fastened in a position where the towing wheels 58 pass through the openings 122 of the feet 72. When assembled as such, the skirt 120 that extends partially around the opening 122 of each of the feet 72, together with the corresponding wheel mount receptacle 80 of the main assembly housing 68, forms a housing for the corresponding towing wheel 58 and wheel mount 70.

The linkage assembly 76 is assembled to the main assembly housing 68 by passing the tines 160 of the forked end 162 of each of the arms 156 through the vertical slots of one of the wheel mount receptacles 80 and through the arm slots 110 of the corresponding wheel mount 70. To do this, the locking protrusions 138 of the locking members 128 are forced out of the locking indentations 106 of the wheel mounts 70 and the wheel mounts are forced upwardly into the wheel mount receptacles 80. Each lock release member 158 is then positioned such that one of the arms 156 passes through the slit 176 in the main body 168 of the lock release member 158 with the inboard suface 169 of the lock release member facing away from the forked end 162 of the arm. The side edges 174 of each lock release member 158 are then slid into the corresponding lock release guides 94 of the main assembly housing 68. Finally, the arms 156 are brought into a position such that the pivot journal 166 of each of the arms 156 is aligned with one of the arm mounts 96 of the main assembly housing 68 where a pivot pin is then used to pivotally connect the arm to the main assembly housing.

Once the base assembly 56 is assembled as described above, the base assembly is fastened to the pack portion 52 of the piece of baggage 50 using fasteners or other equivalent means. The base section 64 of the towing member 54 is then connected by a pin type fastener to the towing member mount 92 of the main assembly housing 68 with the free ends 164 of the arms 156 of the linkage assembly 76 extending through the slots 66 of the base section 64 of the towing member 54.

Figure 5:
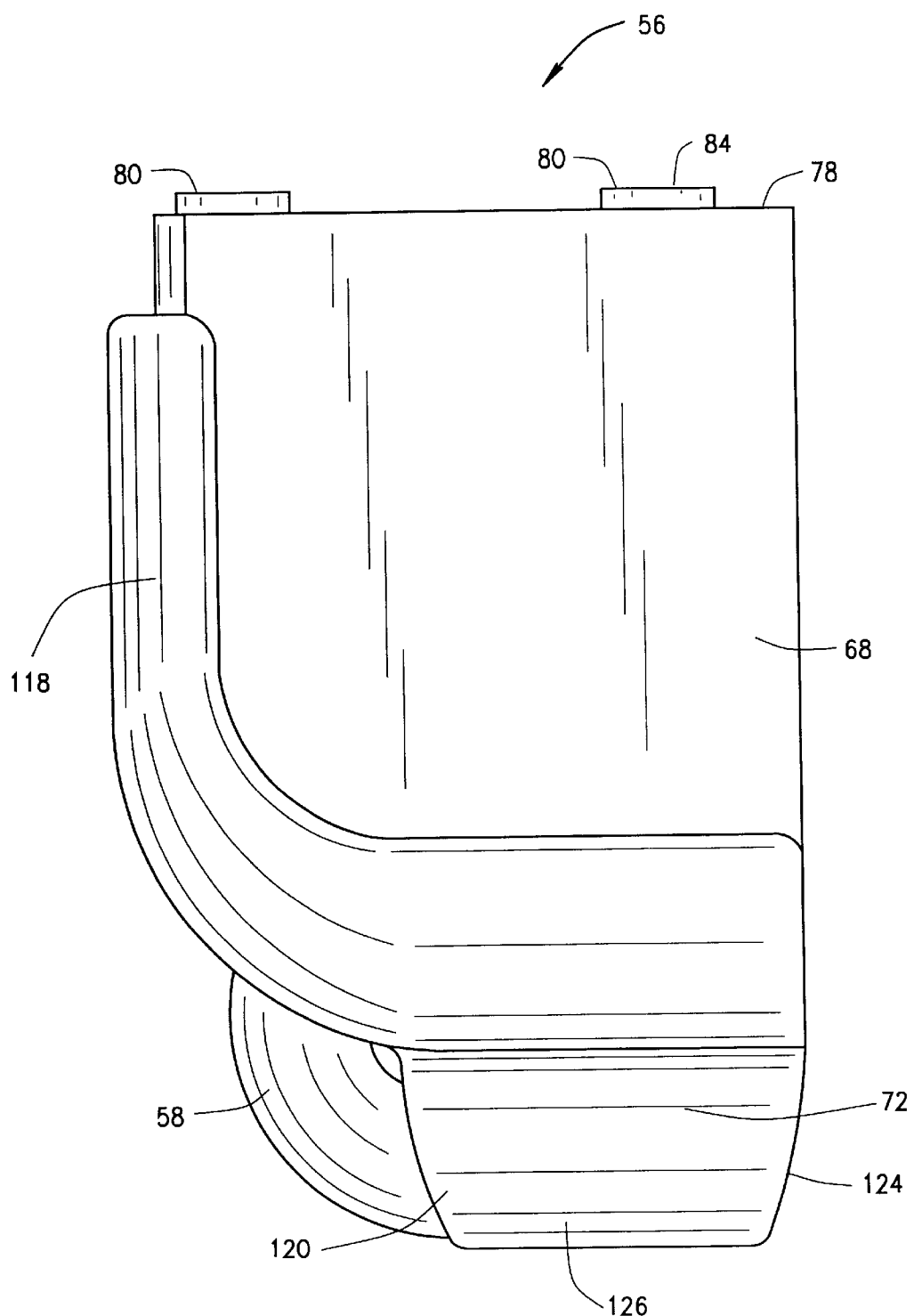
FIG. 5 is a right-side view of the base assembly of the preferred embodiment of the invention shown with the towing wheels in the towing position.
Figure 6:
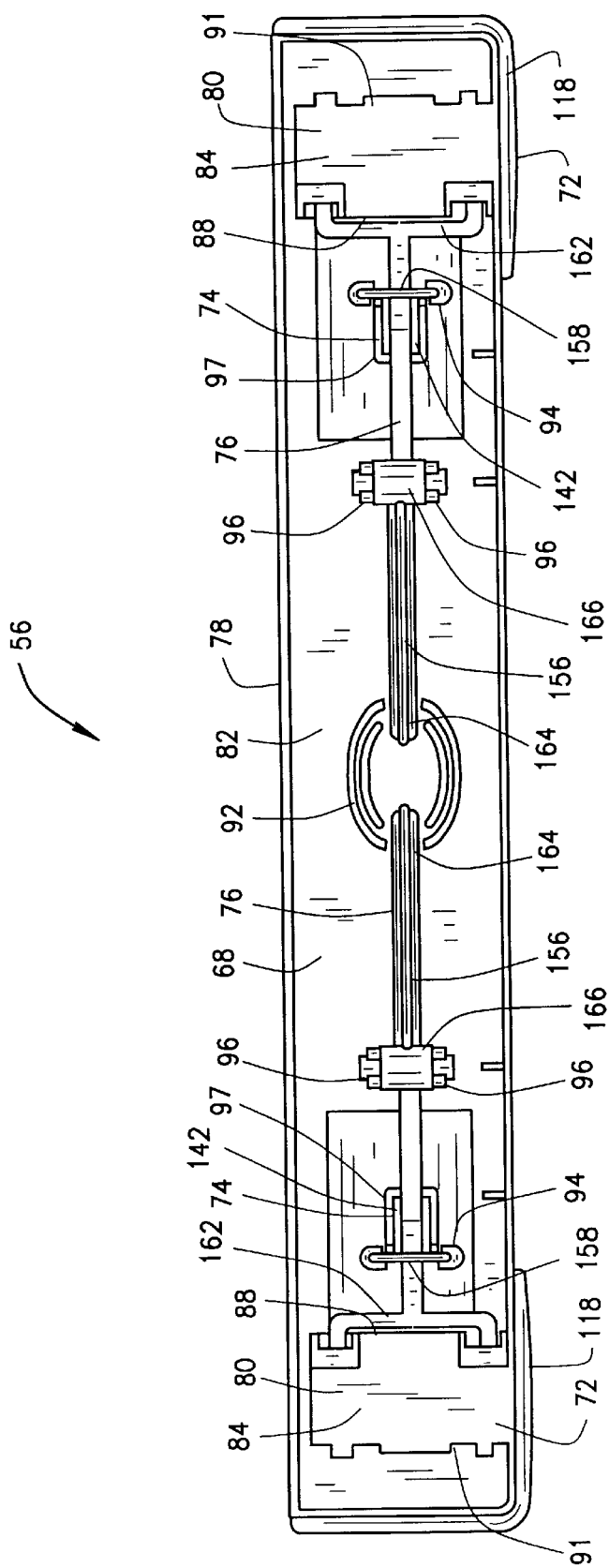
FIG. 6 is a top view of the base assembly of the preferred embodiment of the invention.
Figure 7:
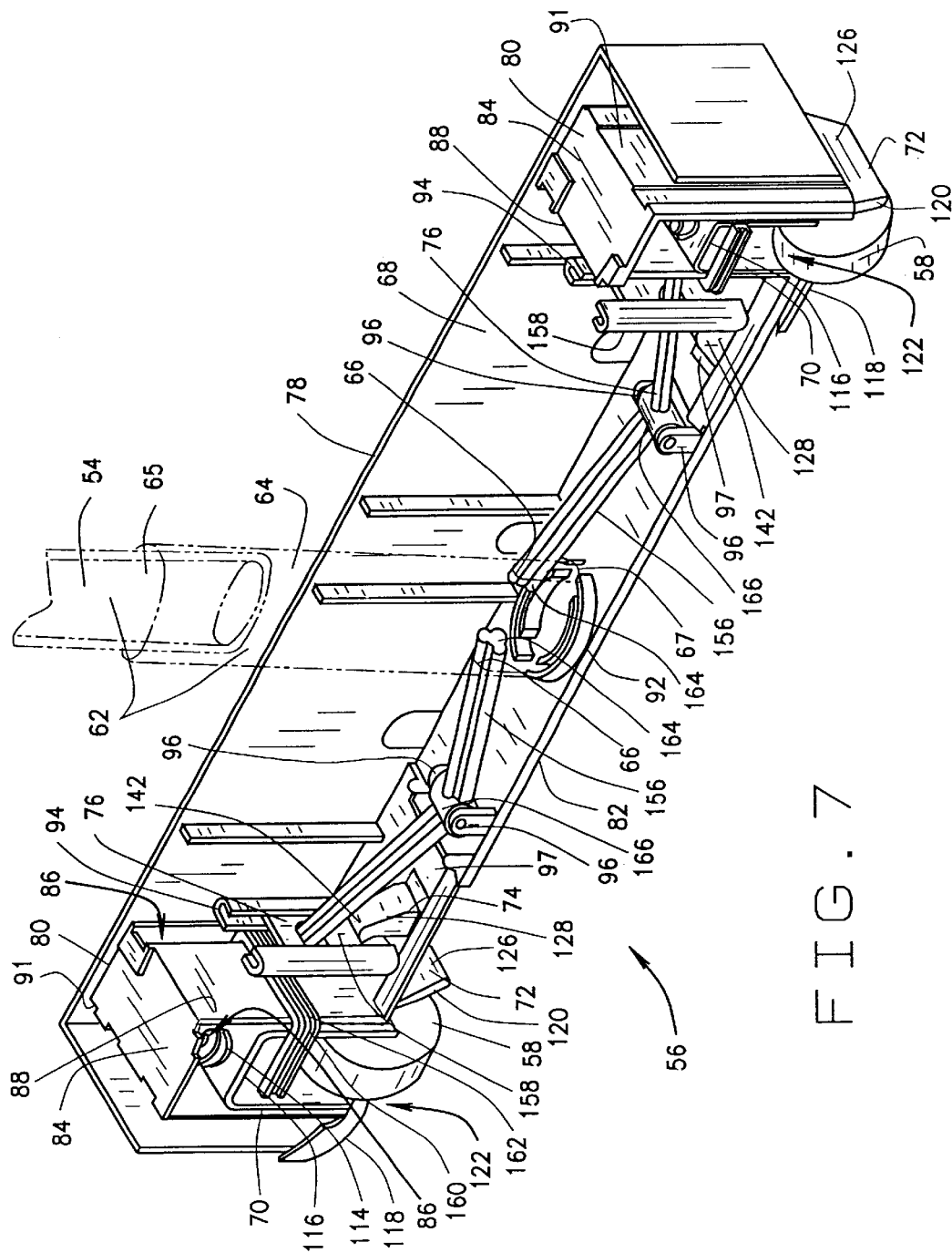
FIG. 7 is an isometric view of the base assembly of the preferred embodiment of the invention shown in cross-section with the relative placement of the towing member indicated in dashed lines and with the towing wheels in the towing position.
Figure 8:
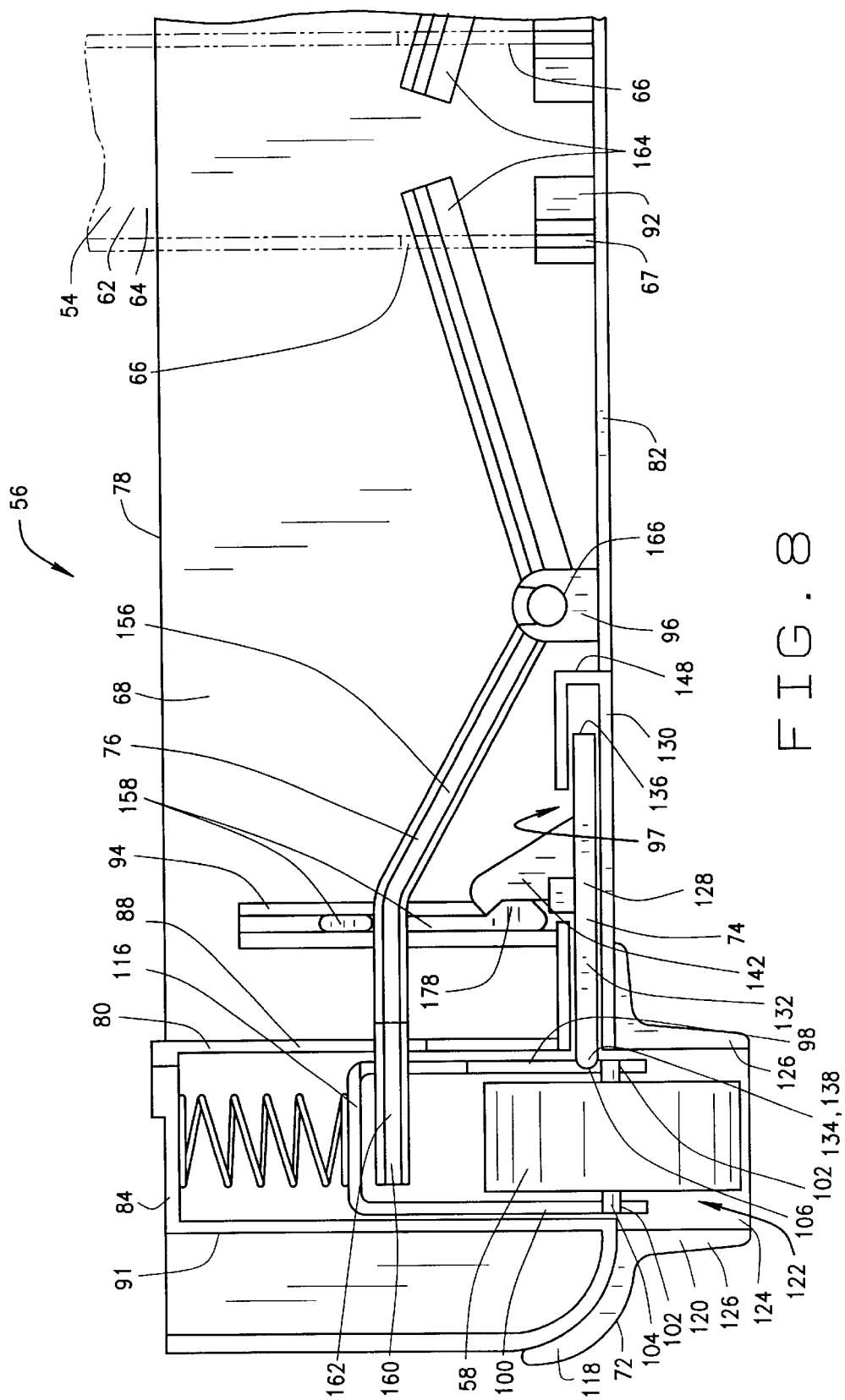
FIG. 8 is a partial front view of the base assembly of the preferred embodiment of the invention shown in cross-section with the relative placement of the towing member indicated in dashed lines and with the towing wheels in the towing position.

When assembled as describe above, the towing wheels 58 of the piece of baggage 50 move relative to the remainder of the base assembly 56 in response to movement of the towing member 54 between the extended and retracted positions. When the towing member is in the extended position, the towing wheels are positioned in a towing position as shown in FIG. 8. In the towing position, the wheel mounts 70 are positioned relative to the wheel mount receptacles 80 of the main assembly housing 68 where the locking protrusions 138 of the locking members 128 engage in the locking indentations 106 of the wheel mounts 70 and the towing wheels 58 partially protrude from the housing formed by each of the feet 72 together with the foot's corresponding wheel mount receptacle 80, as best shown in FIG. 5. Thus, in the towing position, the towing wheels 58 are locked in position relative to the main assembly housing 68 of the base assembly 56. The skirt 120 of each of the feet 72 is dimensioned such that it extends slightly below the towing wheels 58 when the towing wheels are in the towing position. This allows the piece of baggage 50 to be supported by the feet 72 on a surface in an upright, stationary position and also facilitates the movement of the towing wheels 58 into the towing position as described below.

With the towing wheels 58 in the towing position as described above, the piece of baggage 50 can be towed along the ground by tilting the piece of baggage off of the feet 72 and onto the towing wheels. When the piece of baggage 50 is being towed, the weight of the piece of baggage and any contents in the storage compartments 60 of its pack portion 52 is transferred from the towing wheels 58 to the main assembly housing 68 of the base assembly 56 via the locking assembly 74. Thus, none of the weight is borne by the linkage assembly 76, thereby eliminating the need for more robust linkage assembly components.

Figure 9:
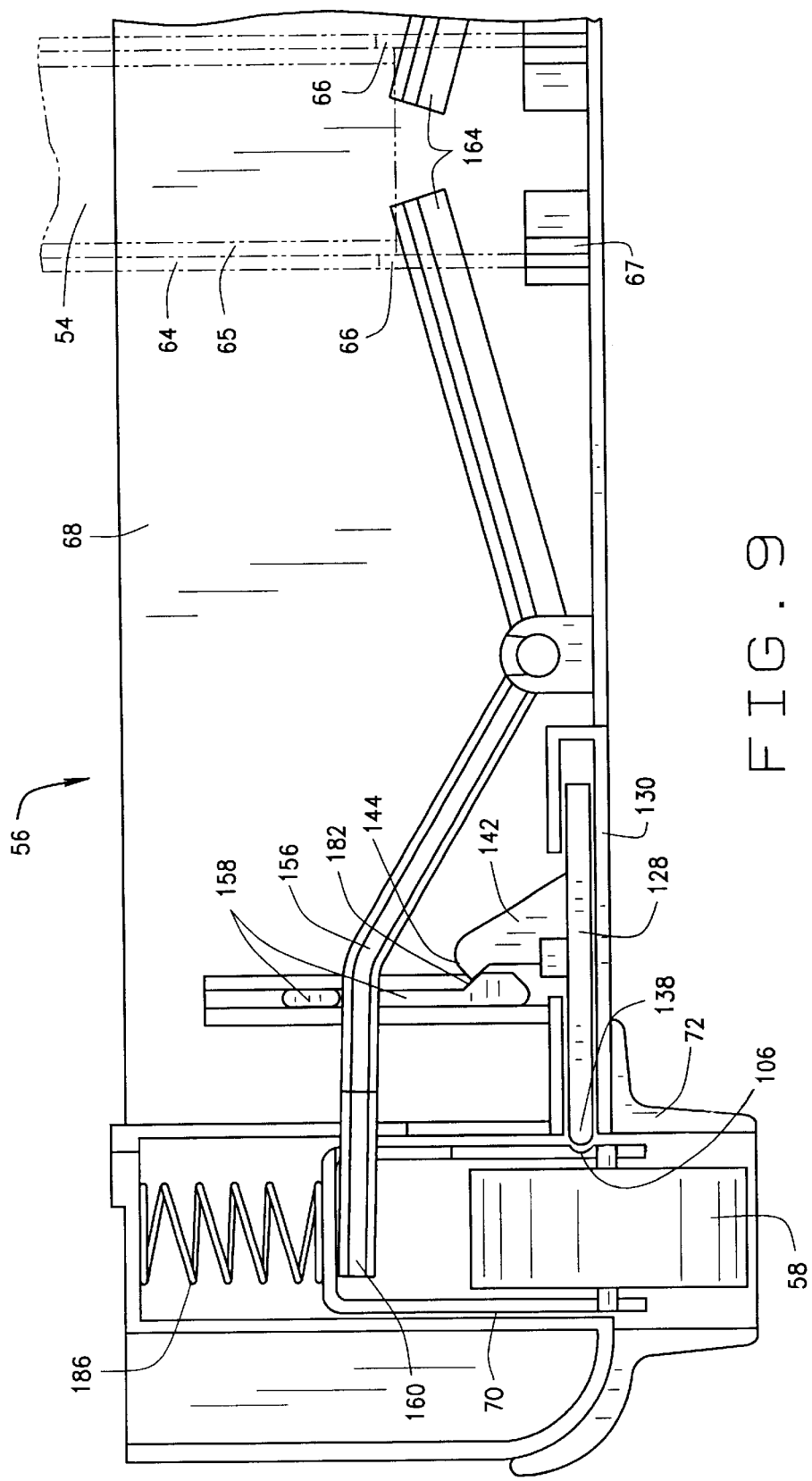
FIG. 9 is a partial front view of the base assembly of the preferred embodiment of the invention shown in cross-section with the relative placement of the towing member indicated in dashed lines and with the linkage in the intermediate position.

When desired, the piece of baggage 50 can be returned to an upright, stationary position where it is supported above the surface by its feet 72 and the towing member 54 can be moved into a retracted position. As this is done, the second section 65 of the towing member 54 slides down into the base section 64 of the towing member where it contacts the free ends 164 of the arms of the linkage assembly 76 and moves the linkage assembly into an intermediate position as shown in FIG. 9. During this transition, the downward movement of the free ends 164 of the arms 156 causes the forked ends 162 of the arms to raise as the arms pivot about the arm mounts 96 of the main assembly housing 68. The arm slots 110 of the wheel mounts 70 and the tines 160 of the arms 156 are dimensioned such that the forked ends 162 of the arms can move slightly upward relative to the arm slots during the transition without the tines 160 contacting the top wall 116 of the wheel mounts. As the forked ends 162 of the arms 156 are raised, the arms engage against edges of the slits 176 of the lock release members 158 and begin to raise the lock release members. The upward movement of the lock release members 158 causes the upper sloped surfaces 182 of their wedge protrusions 178 to engage against the lower sloped surfaces 146 of the release tabs 142 of the locking members 128. This engagement exerts a force on the locking members 128 which causes them to move toward each other and thereby disengages the locking protrusions 138 of the locking members from the locking indentations 106 of the wheel mounts 70.

As the second section 65 of the towing member 54 slides further down into the base section 64 of the towing member, the free ends 162 of the arms 156 of the linkage assembly 76 continue to move downward causing further upward movement of the forked ends 162 of the arms. This causes the tines 160 of forked ends 162 of the arms 156 to engage the top walls 116 of the wheel mounts 70 which moves the wheel mounts further upward into the wheel mount receptacles 80 of the main assembly housing 68 against the force of the springs 186.

Figure 10:
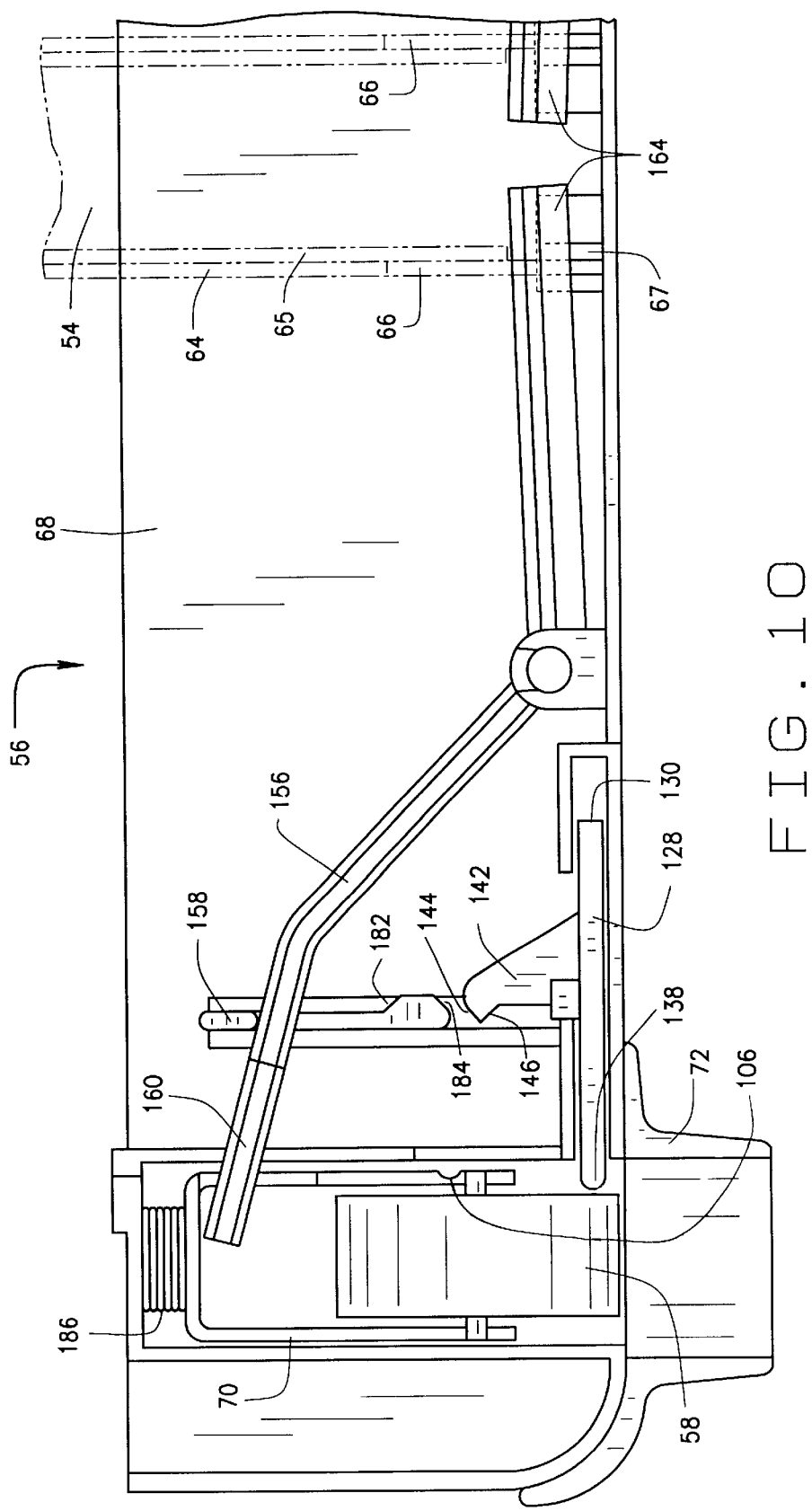
FIG. 10 is a partial front view of the base assembly of the preferred embodiment of the invention shown in cross-section with the relative placement of the towing member indicated in dashed lines and with the towing wheels in the stored position.

When the towing member 54 is completely retracted, the wheel mounts 70 are held by the arms 156 of the linkage assembly 76 in a position far enough into the receptacles 80 of the main assembly housing 68 such that the towing wheels are moved to a stored position as shown in FIG. 10. In the stored position, each towing wheel 58 is positioned completely within the housing formed by each of the feet 72 together with the foot's corresponding wheel mount receptacle 80. Thus, with the towing member 54 retracted, the towing wheels 58 are in the stored position and the piece of baggage 50 can be carried by hand, stored, or otherwise utilized without the risk of the towing wheels marring clothing or upholstery. Furthermore, when the towing wheels 58 are in the stored position, the towing wheels can not easily be seen and the aesthetic appearance of the piece of baggage 50 is thereby improved.

To return the towing wheels 58 of the piece of baggage 50 to the towing position, the towing member 54 is simply extended from the piece of baggage. When this is done, the second section 65 of the towing member 54 no longer holds the free ends 164 of the arms 156 of the linkage assembly 76 downward and the springs 186 between the wheel mounts and the tops 84 of the wheel mount receptacles 80 of the main assembly housing 68 cause the wheel mounts 70 and the towing wheels 58 to move downward into the towing position. As this occurs, the arms 156 engage edges of the slits 176 of the lock release members 158, thereby causing the lock release members 158 to move downward in the lock release member guides 94. During this movement, the lower sloped surfaces 184 of the wedge protrusions 178 of the lock release members 158 engage against the upper sloped surfaces 144 of the release tabs 142 of the locking members 128, causing the locking members to move toward each other. This allows the wedge protrusions 178 of the lock release members 158 to pass the under the lower sloped surfaces 146 of the release tabs 142 of the locking members 128 where the locking members can then move apart from each other to reengage the locking protrusions 138 of the locking members into the locking indentations 106 of the wheel mounts 70. It should be appreciated that because the feet 72 are configured to support the piece of baggage 50 such that the towing wheels 58 are positioned slightly above the ground even when the towing wheels are in the towing position, the weight of the piece of baggage is not borne by the towing wheels as they move downward from the stored position to the towing position.

While the present invention has been described by reference to a specific embodiment, it should be understood that modifications and variations of the invention could be constructed without departing from the scope of the invention defined by the following claims.

What is claimed:

1. A towable piece of baggage comprising:

a pack portion configured to receive and carry objects;

a telescoping towing member connected to the pack portion, the towing member telescoping between retracted and extended positions relative to the pack portion; and two wheel assemblies connected to the pack portion, each of the two wheel assemblies comprising a wheel, a wheel mount and a wheel housing, the housing having an internal cavity and the wheel being mounted for rotation to the wheel mount in a manner such that the wheel is movable between stored and towing positions relative to the wheel housing by linearly sliding the wheel mount relative to the wheel housing, the wheel at least partially protruding from the cavity of the wheel housing when in the towing position and being positioned within the cavity of the wheel housing when in the stored position, the wheel assemblies being connected to the towing member in a manner such that the wheel of each of the wheel assemblies moves into the towing position in response to the towing member being moved from the retracted position to the extended position and such that the wheel of each of the wheel assemblies moves into the stored position in response to the towing member being moved from the extended position to the retracted position.

2. The towable piece of baggage of claim 1, wherein:

each of the two wheel assemblies further comprises a locking member which moves between locked and unlocked positions in response to movement of the towing member between the retracted and extended positions, the locking member being connected to the housing and to the wheel and being adapted to prevent the wheel from moving between the stored and towing positions relative to the housing when the locking member is in the locked position and to allow the wheel to move between the stored and towing positions when the locking member is in the unlocked position.

3. The towable piece of baggage of claim 2, wherein:

the locking member of each of the wheel assemblies is adapted to be in the locked position when the wheel is in the towing position.

4. The towable piece of baggage of claim 3, further comprising:

a linkage connecting the towing member to the two wheel assemblies, the linkage causing each locking member to move from the locked position to the unlocked position and then causing each wheel to move from the towing position to the stored position in response to movement of the towing member from the extended position to the retracted position.

5. The towable piece of baggage of claim 1, wherein:

the pack portion has a base configured to support the pack portion in an upright, stationary position on a surface, the two wheels being positioned relative to the base where each of the two wheels, when in the towing position, is spaced above the surface when the pack portion is supported by the base in the upright, stationary position and each of the two wheels engages with the surface when the base is tilted from the upright, stationary position.

6. A towable piece of baggage comprising:

a pack portion configured to receive and carry objects;

a means for towing connected to the pack portion, the means for towing being movable between retracted and extended positions relative to the pack portion; and two wheel assemblies connected to the pack portion, each of the two wheel assemblies comprising a wheel, a wheel mount and a wheel housing, the housing having an internal cavity and the wheel being mounted for rotation to the wheel mount in a manner such that the wheel is movable between stored and towing positions relative to the wheel housing by linearly sliding the wheel mount relative to the wheel housing, the wheel at least partially protruding from the cavity of the wheel housing when in the towing position and being positioned within the cavity of the wheel housing when in the stored position, the wheel assemblies being connected to the means for towing in a manner such that the wheel of each of the wheel assemblies moves into the towing position in response to the means for towing being moved from the retracted position to the extended position and such that the wheel of each of the wheel assemblies moves into the stored position in response to the means for towing being moved from the extended position to the retracted position wherein:

the housing of each of the two wheel assemblies has a foot portion that is configured to partially support the pack portion in an upright, stationary position on a surface, the foot portion of the housing having a wall that defines at least a portion of the cavity of the housing, the foot portion being dimensioned such that the wheel of each of the two wheel assemblies, when in the towing position, is spaced above the surface when the pack portion is supported by the foot in the upright, stationary position and the wheel of each of the wheel assemblies engages with the surface when the pack is tilted from the upright, stationary position.

7. A towable piece of baggage comprising:

a pack portion configured to receive and carry objects;

a means for towing connected to the pack portion, the means for towing being movable between retracted and extended positions relative to the pack portion;

two wheels connected to the pack portion, each of the two wheels being connected to the pack portion in a manner such that the wheel is movable between stored and towing positions relative to the pack portion, each of the two wheels being part of a wheel assembly comprising the wheel, a wheel mount, and a wheel housing having an internal cavity, the wheel housing being connected to the pack portion, the wheel being mounted for rotation to the respective wheel mount, and the wheel mount being linearly slideably engaged with the wheel housing in a manner such that the linear slideable engagement of the wheel housing allows the wheel to at least partially protrude from the cavity of the wheel housing when in the towing position and the wheel to be positioned within the cavity of the wheel housing when in the stored position;

means for linkage connecting the means for towing to the two wheels in a manner to cause each of the two wheels to move between the towing and stored positions in response to movement of the means for towing between the extended and retracted positions respectively; and means for locking connected to the means for towing and the wheels, the means for locking moving between locked and unlocked positions in response to movement of the means for towing between the extended and retracted positions respectively, the means for locking preventing each of the wheels from moving from the towing position to the stored position when the means for locking is in the locked position and allowing each of the wheels to move between the stored and towing positions when the means for locking is in the unlocked position, the means for locking being configured and adapted to transmit load from each of the wheels to the pack portion by bypassing the means for linkage such that the means for linkage is relieved of load when the means for locking is in the locked position and each of the two wheels are in the towing position.

8. The towable piece of baggage of claim 7, wherein:

the means for linkage connects the means for locking to the means for towing such that the means for linkage moves the means for locking from the locked position to the unlocked position in response to the means for towing being moved from the extended to the retracted position.

9. The towable piece of baggage of claim 7, wherein:

the means for locking comprises two separate locking members that each prevent one of the two wheels from moving from the towing position to the stored position when the means for locking is in the locked position.

10. The towable piece of baggage of claim 7, wherein:

the wheel housing of each of the two wheel assemblies has a foot portion that is configured to partially support the pack portion in an upright, stationary position on a surface, the foot portion of the housing having a wall that defines at least a portion of the cavity of the wheel housing and that has an opening therethrough, the foot portion being dimensioned such that the wheel of each of the two wheel assemblies, when in the towing position, is spaced above the surface when the pack portion is supported by the foot in the upright, stationary position and the wheel of each of the wheel assemblies engages with the surface when the pack is tilted from the upright, stationary position.

11. The towable piece of baggage of claim 7, wherein:

the pack portion has a base configured to support the pack portion in an upright, stationary position on a surface, the two wheels being positioned relative to the base where each of the two wheels, when in the towing position, is spaced above the surface when the pack portion is supported by the base in the upright, stationary position and each of the two wheels engages with the surface when the base is tilted from the upright, stationary position.

12. A method of repositioning wheels on a piece of towable baggage, the method comprising:

providing a piece of baggage having a pack portion, a pair of wheels, and a retractable telescoping towing member, the towing member connected to the pack portion and telescoping between extended and retracted positions relative to the pack portion, the pair of wheels being movable between stored and towing positions relative to the pack portion;

moving the wheels from the stored position to the towing position by moving the towing member from the retracted position to the extended position;

locking the wheels in the towing position by positioning the towing member in the extended position;

unlocking the wheels while the wheels are in the towing position by moving the towing member from the extended position; and then moving the wheels from the towing position to the stored position by further moving the towing member from the extended position to the retracted position;

wherein the steps of moving the wheels from the stored position to the towing position and moving the wheels from the towing position to the stored position comprise moving the wheels along a linear trajectory relative to the pack portion as they move between the stored and towing positions.

13. The method of claim 12, wherein the step of providing a piece of baggage further comprises providing the piece of baggage with a pair of wheel housings having inner cavities and wherein the wheels are each positioned within the inner cavity of one of the housings when the wheels are in the stored positioned and are each positioned at least partially protruding from the cavity of one of the housings when the wheels are in the towing position.

* * * * *